United States Patent [19]

Reich

[11] Patent Number: 5,247,309
[45] Date of Patent: Sep. 21, 1993

[54] OPTO-ELECTRICAL TRANSMITTER/RECEIVER MODULE

[75] Inventor: Stanley M. Reich, Jericho, N.Y.

[73] Assignee: Grumman Aerospace Corporation, Bethpage, N.Y.

[21] Appl. No.: 769,560

[22] Filed: Oct. 1, 1991

[51] Int. Cl.⁵ .......................... G01S 13/66; H01Q 3/26
[52] U.S. Cl. ..................................... 342/368; 342/175
[58] Field of Search .............................. 342/368, 175

[56] References Cited

U.S. PATENT DOCUMENTS

| | | | |
|---|---|---|---|
| 4,739,334 | 4/1988 | Soref ................................... | 342/368 |
| 4,885,589 | 12/1989 | Edward et al. ................. | 342/368 X |
| 4,898,443 | 2/1990 | Epworth et al. ................. | 350/96.15 |
| 5,051,754 | 9/1991 | Newberg ............................. | 342/375 |

OTHER PUBLICATIONS

Wallington et al. "Optical Techniques for Signal Distribution in Phased Arrays", 1979 International Symposium on Circuits on Systems, Tokyo, Japan.
Optical Beam Control of mm-Wave Phased Array Antennas for Communications by A. Daryoush, et al., Microwave Journal Mar. 1987.
"Distributed Beamsteering Control of Phased Array Radars", by T. P. Waldron, et al., Micowave Journal, Sep. 1986.
"Integrated Optic Components for Microwave Coherent Lightwave Systems" by J. J. Pan, MSN&CT, Sep. 1987.
"Optoelectronic Signal Processing for Phased-Array Antennas" vol. 886, chaired by Kul B. Bhasin, SPIE, 1988.
"Fiber Optics and Opto-Electronics for Radar and Electronic-Warfare Application", by J. J. Pan, MSN&CT, Oct. 1987.

"Array Radars: An Update" by Eli Brookner, Microwave Journal, Mar., 1987.
"Optical Generation and Control of Microwaves and Millimeter-Waves" by Chi H. Lee, 1987, IEEE.
"Complex Phasor Modulations for Simultaneous Amplitude and Phase Control" by Dr. J. Curtis.
"Laser Diode Non-Linearity and Its Applications in the Optical Injection Locking of Solid State Oscillators" by A. S. Daryousch, et al., SPIE vol. 886 1988.
"Application Notes" published by Olektron Corporation, Webster, Massachusetts.
"RE Components and Subsystems" published by Olektron Corporation Webster, Massachusetts.

Primary Examiner—Gilberto Barrón, Jr.
Attorney, Agent, or Firm—Scully, Scott, Murphy & Presser

[57] ABSTRACT

A fiber optic transmitter/receiver module used for controlling multi-axis beam steering of each individual radiating element in a phased array antenna and which is an integral part of a reconfigurable fiber optic corporate feed concept. In the receive mode of operation an incoming signal is captured, amplified and converted into the light domain by means of optical heterodyning. The relative phase and amplitude of the signal would be controlled by optically adjusting the amplitude and phase of a local oscillator. The local oscillator is sent to each fiber optic transmitter/receiver module. In the transmit mode of operation a signal for transmission which is in the light domain is down converted into the electromagnetic domain using optical mixing techniques. Once again, the relative phase and amplitude of the transmission signal would be controlled by the local oscillator. The beam steering capability is accomplished by configuring the local oscillator for each element of the antenna with a specific amplitude and phase.

44 Claims, 6 Drawing Sheets

OPTO-ELECTRICAL TRANSMITTER/RECEIVER MODULE

BACKGROUND OF THE INVENTION

1. Field of Invention

This invention relates to antennas for radar and communication systems, and more particularly, to phased array antennas and their controllers used in radar and communication systems. This invention also relates to fiber optic corporate feed networks for use in phased array antennas

2. Discussion of the Prior Art

The advent of wireless forms of communication necessitated the need for antennas. Antennas are required by every communication and radar system, and depending upon the specific application, antennas can be required for both receiving and transmitting signals. Antennas performing both receiving and transmitting functions are particularly important in radar and point-to-point communications. Early stages of wireless communication consisted of transmitting and receiving signals at lower frequencies, typically below 1 MHz, which resulted in signal wavelengths greater than 0.3 km. If the physical size of the antenna was not at least equal to the signal wavelength, then the antenna was not capable of directional transmission or reception. In more modern forms of wireless communication, such as with communication satellites, the frequency range of transmitted signals have shifted to the microwave spectrum where signal wavelengths are in the 1.0 cm to 30.0 cm range. Therefore, antennas can be practically realized with sizes much greater then the signal wavelength resulting in highly directional and narrow beams of radiation.

In radar systems the antenna must be capable of determining a targets direction, and to accomplish this requires a well defined narrow beam of radiation that searches for the target. Narrow radiation beams are created by antennas that are large compared to the signal wavelength. In addition, in order to be able to track or search for a target, the beam must be able to be moved in at least one direction, but preferably in two directions. Movement of the beam was typically accomplished by mechanically rotating a reflector; however, fixed array and phased array antennas provide a more feasible electronic means for scanning purposes.

Today virtually every radar and many communications system antennas have requirements for high directivity, high angular resolution and the ability to electronically scan or be reconfigured. These functions are typically accomplished using a phased array antenna with a large number of elements. An antenna array is a collection of two or more identical antennas that are closely arranged in a predetermined pattern and energized to produce high gain beams in specific directions. When antennas are combined in an array, constructive radiation interference results in a main beam of highly concentrated radiation, while destructive radiation interference outside the main beam reduces stray radiation. In order to produce the desired radiation patterns the individual radiating elements or antennas are characterized and each element is energized with the proper phase and amplitude relative to the other elements in the array. Basically, the antenna array exploits the interference that results from an array of many individual radiators which results in high gain while minimizing stray radiation.

With the elements of an array antenna closely spaced, it is preferable, if possible to feed all elements of the array with a single transmission line. One particular method of feeding all elements from a single transmission line involves using the corporate feed technique. In the corporate feed technique, all elements are fed in parallel using power splitters and equal delay transmission lines. The phase shift between elements can be controlled by phase shifters, and if the phase shifts can be varied, the array antenna becomes a phased array antenna. In a phased array antenna where each element has phase adjustability, the beam may be scanned by application of the appropriate phase gradient.

The following references disclose techniques for controlling and operating phased array antennas. The article "Optical Beam Control of mm-Wave Phased Array Antennas For Communications" by A. Daryoush et al., Microwave Journal, March 1987 discloses fiber optic links for the distribution of control and communications signals in a phased array system. The means and process disclosed in this article are for a fiber optic link which utilizes electronic multiplication techniques as opposed to the heterodyning and modulation techniques for up and down conversion as employed by the present invention.

The article "Distributed Beamsteering Control of Phased Array Radars" by T. P. Waldron et al., Microwave Journal, September 1986 discloses a transmitter/receiver module with a distributed control concept for the control of phased array antennas; however, the article does not disclose a transmitter/receiver module employing integrated fiber optic techniques as well as integrated electronic techniques in a single compact package.

SUMMARY OF THE INVENTION

The present invention is directed to an opto-electric transmitter/receiver module which is used for controlling multi-axis beam scanning for each individual element in a phased array antenna. The opto-electric transmitter/receiver module is part of a fiber optic corporate feed network used in phased array antennas. The opto-electric transmitter/receiver module is comprised of two sections, one of which contains optical components and the second of which contains electrical components. The optical section consists of integrated optical components implemented in lithium niobate ($LiNbO_3$), and the electronics section consists of integrated electrical components implemented in gallium arsenide (GaAs). The two sections are tied together via electrical and fiber optic connections and each section is responsible for a specific set of tasks. The optical section is responsible for the optical heterodyning and modulation process as well as the amplitude and phase control of a local oscillator beam to provide the amplitude and phase orientation of signals leaving or entering the specific element of the phased array antenna. In a second embodiment of the invention, the amplitude and phase control is done on the signal for transmission as opposed to the local oscillator beam. As stated previously, by proper manipulation of the phase and amplitude of the local oscillator beam for each element in the phased array antenna, complete multi-axis beam steering is possible. The optical heterodyning process includes the light amplitude modulation of the local oscillator beam with an incoming electromagnetic signal, and the conversion of a light amplitude modulated beam into the electrical domain. The electronics section is responsible for the signal processing of the received signals as well as the signal processing of the signals to be transmitted. The signal processing involved is part of the amplitude modulation and down conversion processes.

The opto-electric transmitter/receiver of the present invention is used for controlling multi-axis beam steering of an individual element in a phased array antenna. The module comprises a means for modulating a first optical signal with an incoming radio frequency signal captured by the individual element; a means for optically heterodyning a second optical signal carrying a radio frequency signal and converting the radio frequency signal to the electrical domain for transmission by the individual element; and a control means for applying preselected phase and amplitude information to at least the second optical signal.

In the transmit mode of operation the opto-electric transmitter/receiver module is used for directing a transmission signal radiating from a single radiating element of a phased array antenna to a predetermined and controllable set of coordinates in space. The transmitter/receiver module comprises means for optically heterodyning an optical signal carrying a radio frequency signal; means for converting the radio frequency signal to the electrical domain for transmission by said radiating element; control means for applying preselected phase and amplitude information to the optical signal; means for decoding a composite optical signal to determine phase an amplitude information for the control means; and switching means for switching the transmitter/receiver module into the transmit mode of operation.

In the receive mode of operation the opto-electric transmitter/receiver module is used for controlling a single element of a phased array antenna to scan for an incoming electromagnetic signal. The transmitter/receiver module comprises means for modulating an optical signal with an incoming radio frequency signal captured by the antenna element; a control means for applying preselected phase and amplitude information to the optical signal; a means for decoding a composite optical signal to determine phase and amplitude information for the control means; and a switching means for switching the module into the receive mode of operation.

The integrated opto-electric transmitter/receiver module for controlling multi-axis beam steering of an individual antenna element in a phased array antenna can be mounted in an outer skin of an aircraft. The integrated opto-electric module comprises an antenna element means for reception and transmission of signals; a planar, flexible mounting means having the transmitter/receiver module mounted thereon; a means for optically connecting the transmitter/receiver module to a fiber optic interface; a means for electrically connecting the transmitter/receiver module to the antenna element; and a spacing means for creating a space for the transmitter/receiver module between the outer skin of the aircraft and an inner skin of the aircraft.

In the receive mode of operation, an incoming signal is amplified to a voltage high enough to drive a light amplitude modulator. In some embodiments no amplification is necessary between the light modulator and antenna. The incoming signal is a radio frequency signal that is used to modulate a local oscillator beam so that the local oscillator beam contains the information that the original radio frequency signal contained. The light amplitude modulated signal is then processed by an off site receiver where the desired information is removed from the local oscillator by a down conversion process. The local oscillator beam is derived from a laser and distributed to all of the opto-electric transmitter/receiver modules by an optical star coupler. Upon entering the opto-electric transmitter/receiver, the amplitude and phase of the local oscillator beam is controlled to produce the desired orientation for the captured signal for the specific element of the phased array antenna.

In the transmit mode of operation, an outgoing signal along with various control signals supplied by the transmitter which is part of a transmitter/receiver processing unit, all of which are in the light domain, are received by the opto-electric transmitter/receiver module. The outgoing signal is optically summed with the local oscillator beam and subsequently converted to an electromagnetic radio frequency signal. The purpose of summing the outgoing signal with the local oscillator beam is to provide the outgoing signal with a predetermined amplitude and phase resulting in the signal radiating into space to a specific set coordinates. The converted signal is amplified and routed to its associated element of the phased array and radiated into space.

The radiation pattern and the scanning rate of a phased array antenna is a function of the number of individual radiating elements and the rate at which their frequency and phase can be changed. Presently the devices which provide the variable frequency and phase energy are large, slow in operation and generate large amounts of wasted energy in the form of heat loss. To meet the future requirements of radar and communications systems, especially those used in aircraft and other vehicles that need compact conformally shaped phased array antennas that are jam resistant and easily reconfigurable, a fiber optic feed concept employing an opto-electric transmitter/receiver module is disclosed.

The opto-electric transmitter/receiver module of the present invention provides for a compact arrangement of integrated optical elements and integrated electric amplifiers to provide a compact module for use in phased array antennas. The opto-electric transmitter/receiver is small, light weight and is more immune to electromagnetic interference (EMI) than an all electronic system. In addition, the opto-electric transmitter/receiver module can be packaged in a variety of ways and has low power dissipation.

The opto-electric transmitter/receiver module can be employed in phased array radar antennas utilizing corporate feed techniques. The module can be used in jam resistant radar and communications antennas that utilize corporate feed techniques. The module can be used in high density two dimensional corporate feed systems for radar or communications antennas. In addition, the module can be effectively used in imbedded antenna systems such as those used within the body or surface of a vehicle. This application is especially useful and important in vehicles such as airplanes because of the need to maintain an aerodynamic surface.

DESCRIPTION OF THE PREFERRED EMBODIMENT

Figure 1:
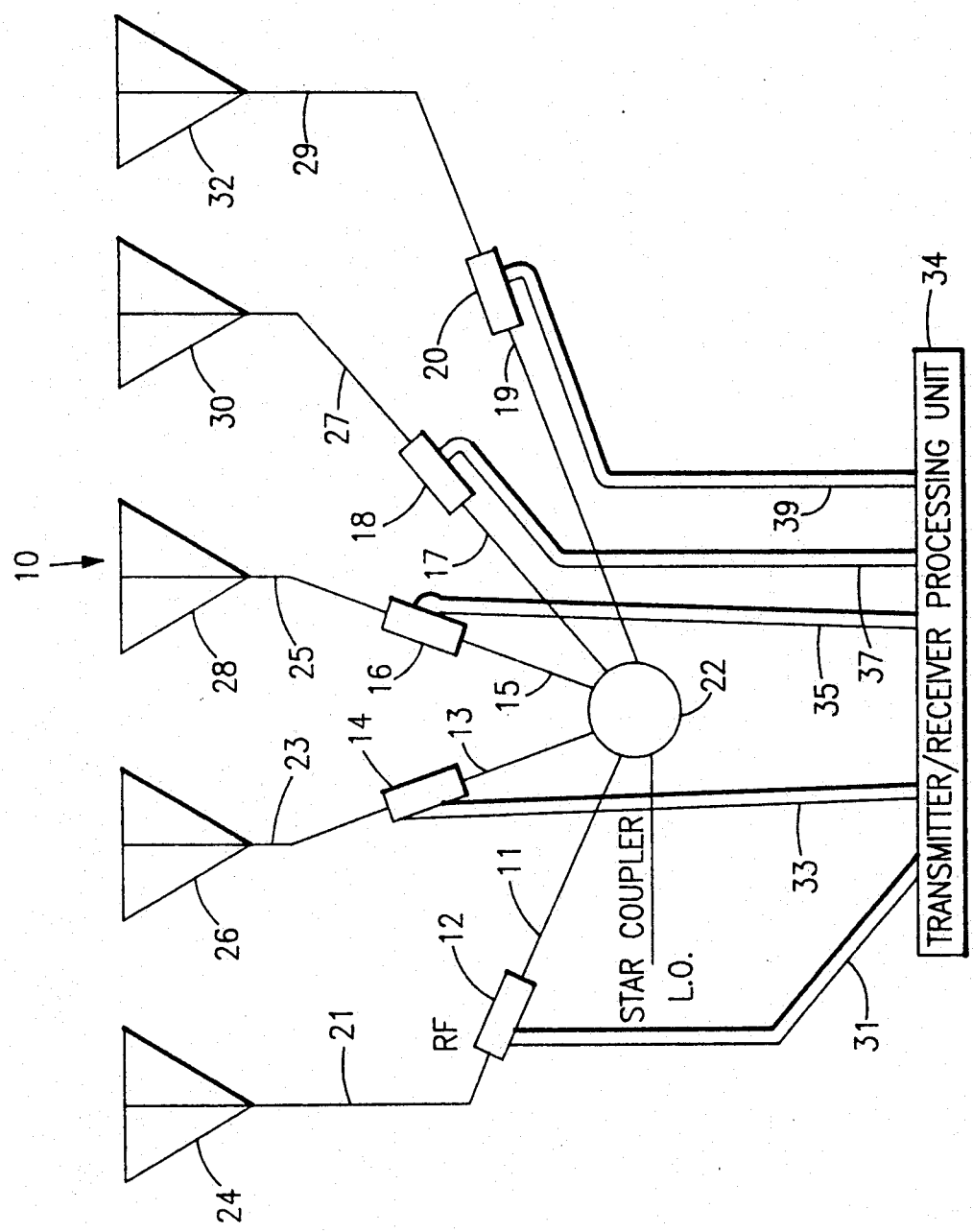
FIG. 1 is a diagrammatic representation of the fiber optic corporate feed system of the present invention.

The optic-electric transmitter/receiver module of the present invention provides for a compact arrangement of integrated optical and electrical components which is used as an integral part of a corporate feed network used in a phased array antenna. The opto-electric transmitter/receiver module is used for controlling multi-axis beam steering of each radiating element of the phased array antenna in order to develop a highly directional antenna capable of scanning for signals of interest in space and determining that location with a high degree of accuracy as well as radiating signals into space to a specific set of coordinates with a high degree of accuracy. The opto-electric transmitter/receiver module is comprised of integrated optical components realized in lithium niobate ($LiNbO_3$) and integrated electrical components realized in gallium arsenide (GaAs). The optical and electrical components interact and communicate through an interface comprising a network of standard electrical connections as well as fiber optic connections.

In the receive mode of operation, a signal of interest is captured by an individual radiating element of the phased array antenna. The captured signal then passes through a switching device that is used to set the opto-electric transmitter/receiver module into the transmit or receive mode of operation. If the switch is commanded to be in the receive mode, then the captured signal is amplified by a series of three amplifiers. The first amplifier is a low noise amplifier which raises the gain of the captured signal without adding additional noise. A low noise amplifier is specifically used because of its ability to amplify very low power signals without adding additional noise, which is inherent in amplifier circuits, to the signal. The remaining two amplifiers are required to raise the amplitude of the captured signal to a level high enough to drive the next stage of operation which is the light amplitude modulation of the local oscillator beam. The three amplifiers and the switching device are all implemented as gallium arsenide semiconductors.

The amplified captured signal is directed to a Mach-Zehnder interferometer light amplitude modulator. The amplified captured signal is used by the interferometer to modulate a local oscillator beam with an amplitude commensurate with that of the amplified captured radio frequency signal. As previously stated in some embodiments no amplification is required and the antenna can be connected directly to the Mach-Zehnder modulator. The local oscillator beam is derived from a laser which feeds an optical star coupler which in turn feeds all the individual opto-electric transmitter/receiver modules. However, before entering the interferometer, the local oscillator beam has its amplitude and phase altered in order to provide the receiver with a specific portion of the captured signal and thus accomplish the beam steering without actually moving the antenna or any element in the antenna. Once the amplitude and phase of the local oscillator beam has been set, the local oscillator beam is directed to the interferometer by a beam splitter. The amplitude and phase control of the local oscillator beam is accomplished via an amplitude and phase controller based on commands from a command and control module. The Mach-Zehnder interferometer and the amplitude and phase controller are integrated optical components utilizing lithium niobate.

The command and control module also outputs commands to the switching device as well as outputting gain values for the low noise amplifier. The command and control module receives its commands from the transmitter/receiver processing unit by way of a wavelength division multiplexer. The transmitter/receiver processing unit sends out optically encoded commands which are decoded by the wavelength division multiplexer and routed to the command and control module. The command and control module is a microprocessor based controller. The commands from the wavelength division multiplexer are decoded by the microprocessor which in turn outputs a set of electrical commands for the low noise amplifier and the Mach-Zehnder interferometer light amplitude modulator.

The modulated light beam is now directed to the transmitter/receiver processing unit where it is down converted to the electrical domain for further processing. The command and control module is an integrated electrical component implemented in gallium arsenide and the wavelength division multiplexer is on integrated optical component fabricated in lithium niobate.

In the transmit mode of operation, a composite signal is supplied to the wavelength division multiplexer from the transmitter/receiver processing unit. The composite beam is comprised of control signals as described above and the signal for transmission. The wavelength division multiplexer separates each of the signals that comprise the composite signal into discrete signals. The control signals are routed to the command and control module for decoding while the signal for transmission is routed to an optical coupler where it is optically summed with the amplitude and phase adjusted local oscillator beam for conversion. The adjusted local oscillator beam and signal for transmission combination is then routed to a photodetector for the actual conversion into the electromagnetic radio frequency domain. As stated previously, in a second embodiment of the invention the signal for transmission is amplitude and phase adjusted as opposed to the local oscillator beam. The reasons for which will be fully explained in subsequent paragraphs. The combination of the optical coupler and the photodetector is commonly referred to as a mixer circuit. The operation of this type of mixer circuit has the same effect as standard electrical mixers used in superheterodyne receivers. The converted signal is amplified by a series of two amplifiers and then routed to the switching device for transmission to the radiating element and then subsequently into space. The optical coupler is an integrated optical component utilizing lithium niobate and the photodetector as well as the amplifiers are integrated electrical components utilizing gallium arsenide.

The amplitude and phase control of the local oscillator beam in the transmit mode is accomplished in a manner identical to that as described in the explanation of the device in the receive mode of operation. The local oscillator beam is used to steer the beams radiating from the elements of the antenna. The local oscillator beam is able to steer the radiating signal because it was optically summed with the signal to be transmitted and the information it contained is transferred to the down converted electrical domain signal.

In the transmit mode of operation, the radiating signal is steered by manipulation of the local oscillator beam or in a second embodiment, by manipulation of the signal for transmission. By adjusting the amplitude and phase of the local oscillator beam, the signal to be transmitted will have a specific amplitude and phase by virtue of the mixing or conversion process. By adjusting the amplitude and phase of the transmission signal directly, the same effect can be achieved. The amplitude and phase of the converted signal for transmission determines its orientation in space. In the receive mode of operation, the incoming signal of interest is also steered by amplitude and phase manipulation of the local oscillator beam. By adjusting the amplitude and phase of the local oscillator beam to be used in the light amplitude modulation process a specific portion, corresponding to the amplitude and phase of the local oscillator beam, of the incoming signal is captured. Therefore, by adjusting the amplitude and phase of the local oscillator beam, beam steering in the transmit or receive mode can be accomplished without physically moving any part of the antenna.

Referring to FIG. 1, a plurality of opto-electric transmitter/receiver modules 12, 14, 16, 18, and 20 are shown as part of a fiber-optic corporate feed network in a phased array antenna 10. The opto-electric transmitter/receiver modules 12, 14, 16, 18 and 22 are connected at one end to an optical star coupler 22 via fiber optic elements 11, 13, 15, 17 and 19 and at the second end to a plurality of individual radiating elements 24, 26, 28, 30 and 32, which comprise the phased array antenna 10, via electric lines 21, 23, 25, 27 and 29. Transmit/receive fibers 31, 33, 35, 37 and 39 carry optically encoded information to a remote transmitter/ receiver processing unit 34 from the opto-electric transmitter/receiver modules 12, 14, 16, 18 and 20 and carry optically encoded information to the opto-electric transmitter/receiver modules 12, 14, 16, 18 and 20 from the remote transmitter/receiver processing unit 34. The transmitter/receiver processing unit 34 is a transmitter/receiver with a microprocessor based control system for controlling the operation of the fiber optic transmitter/receiver modules 12, 14, 16, 18 and 20. A complete detailed description of a single opto-electric transmitter/receiver module including a description of its operation in both the transmit and receive mode is given in subsequent paragraphs.

Figure 2:
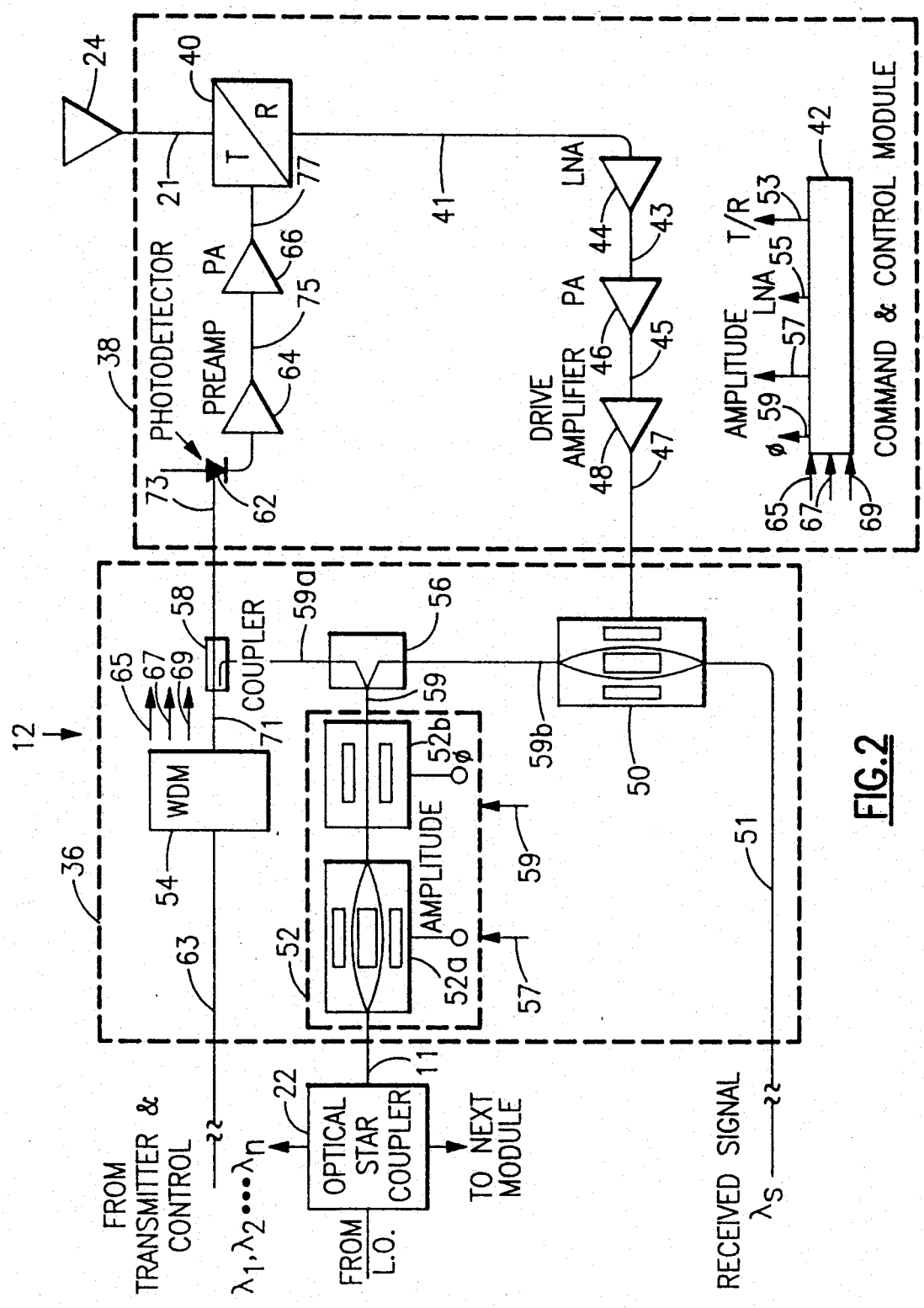
FIG. 2 is a block diagram of the opto-electric, transmitter/receiver module of the present invention.

Referring now to FIG. 2, a single opto-electric transmitter/receiver module 12 is shown. The opto-electric transmitter/receiver module 12 is comprised of an optical elements section 36 comprising integrated optical components utilizing lithium niobate (LiNbOH$_3$) and an electrical elements section 38 comprising integrated electrical components utilizing gallium arsenide (GaAs). The two sections 36 and 38 communicate over a network of fiber optic elements and standard electrical lines. The opto-electric transmitter/receiver module 12 operates in both a transmit and receive mode. The operation of the opto-electric transmitter/receiver module 12 is fully explained for each mode of operation.

RECEIVE MODE OF OPERATION

In the receive mode of operation a specific portion of a radio frequency (RF) signal from space is captured by radiator element 24 of the phased array antenna 10 shown in FIG. 1. The captured signal is then routed to a transmit/receive switching device 40 via signal line 21. The transmit/receive switching device 40 is a simple switching device or switching means which is used to control signal traffic in and out of the opto-electric transmitter/receiver module 12. The transmit/receive switching device 40 is controlled by command and control module 42 which either commands the transmit/receive switching device 40 to switch to the receive mode thereby allowing signals to enter the opto-electric transmitter/receiver module 12 or to switch to the transmit mode thereby allowing signals to exit the opto-electric transmitter/receiver module 12.

The captured signal is then routed to a series of three amplifiers 44, 46, 48 via signal line 41. The three amplifiers 44, 46 and 48 comprise an amplifying means. The first amplifier is a standard low noise amplifier 44 which is used to raise the gain of the incoming radio frequency signal while minimizing the output noise level added to the signal. The low noise amplifier 44 gain in controlled by the command and control module 42. The second amplifier is a pre-amplifier 46 which is also used to raise the gain of the captured incoming radio frequency signal. The input to the pre-amplifier 46 is the output of the low noise amplifier 44. The two amplifiers 44 and 46 are connected via signal line 43. The purpose of the pre-amplifier 46 is to raise the gain of a low level input signal in order to be input into a second series connected amplifier with a higher input level requirement. The third amplifier is a drive amplifier 48 which raises the gain of the captured signal to an amplitude required to drive the next stage of the opto-electric transmitter/receiver module 12. The input to the drive amplifier 48 is the output of the pre-amplifier 46. The two amplifiers 46 and 48 are connected via signal line 45. The output amplitude of the drive amplifier 48 is typically from microvolts up to 5.0 volts which is the necessary voltage level required for the next stage of the signal processing process which is the light amplitude modulation step. With the appropriate bias on the Mach-Zehnder modulator, operation at the 50% point of the cosine square transfer function, sensitivity in the order of a few microvolts is possible. The low noise amplifier 44, the pre-amplifier 46 and the drive amplifier 48 are all standard integrated circuits using GaAs technology and their functions are well known in the art.

The output of the drive amplifier 48 is routed to a Mach-Zehnder interferometer amplitude modulator 50 via signal line 47. Signal line 47 is an electrical connection between the gallium arsenide components and the lithium niobate components. The Mach-Zehnder interferometer 50 also receives an amplitude and phase adjusted local oscillator beam over fiber 59b from an amplitude and phase control module 52. The amplitude and phase control module 52 is used as a means for light amplitude modulation and phase manipulation of the local oscillation beam. The interferometer 50 uses the captured signal which has been amplified to the specified voltage level to provide light amplitude modulation of the amplitude and phase adjusted local oscillator beam carried on fiber 59b at the RF frequency. The basic amplitude and phase adjusted local oscillator optical beam carried on fiber 59b is split into two beams travelling over different paths after entering the interferometer 50. One beam is allowed to pass directly through without being manipulated in any manner and the second beam is forced to travel over a different length path. The path length is effectively altered by changing the potential across the lithium niobate in the region of the second beam. This change in potential causes the index of refraction of lithium niobate to change thereby changing the phase of the beam passing therethrough. The two beams are subsequently combined which causes an amplitude modulated interference pattern. This type of light amplitude modulation is known as fringe modulation interference and the amount of modulation is determined by the potential that exists across the lithium niobate. Therefore, as indicated above, the amplified captured signal causes the potential across the lithium niobate to fluctuate at its frequency and amplitude thereby causing light amplitude modulation of the amplitude and phase adjusted local oscillator beam carried on fiber 59b. The output of the interferometer 50 is routed to a transmitter/receiver processing unit 34 over a fiber optic path 51. The transmitter/receiver processor unit 34 is shown in FIG. 1. At the transmitter/receiver processing unit 34, the light amplitude modulated signal is converted to an electromagnetic radio frequency signal utilizing standard conversion techniques and is readily available for further processing. The Mach-Zehnder interferometer is a well known device for light amplitude modulation. There are other well known techniques for light amplitude modulation including acousto-optic modulators; however, the Mach-Zehnder interferometer is preferred because it is easily implemented as an integrated element.

The command and control module 42 as mentioned previously, controls the switching modes of the transmitter/receiver device 40 and the gain of the low noise amplifier 44. In addition, the command and control module 42 controls the amplitude and phase of the local oscillator beam on fiber 59. Basically, the command and control module 42 is a microprocessor based control system and associated memory. Commands from the transmitter/receiver processing unit 34 shown in FIG. 1 sends optically encoded command signals to a wavelength division multiplexer 54 which is a simple decoding means that provides the control signals via a plurality of fiber optic paths to the command and control module 42. The microprocessor of the command and control module 42 decodes the received plurality of control signals or commands and issues the proper electrical command signals to the appropriate devices. The transmit or receive signal is routed to the transmitter/receiver switching device 40 via electrical signal line 53, the low noise amplifier gain signal is routed to the low noise amplifier 44 via electrical signal line 55, and the amplitude and phase command signals are routed to the amplitude and phase control module 52 via electrical signal lines 57 and 59 respectively.

The amplitude and phase adjustment of the local oscillator beam carried on fiber 11 is controlled by the amplitude and phase control module 52. By proper adjustment of the amplitude and phase of the local oscillator beam carried on fiber 11, full multi-directional optical beam steering can be accomplished. In other words, by adjusting the amplitude and phase of the local oscillator beam on fiber 61 specific portions of the signal captured by the single radiating element 24 can be isolated, effectively eliminating the need to physically adjust the orientation of the phased array antenna 10 to capture the specific component of the captured signal. The amplitude and phase adjustment or control signals are supplied by the command and control module 42. The amplitude control is accomplished utilizing a Mach-Zehnder interferometer 52a and the phase control is accomplished utilizing a phase shifter module 52b. As explained in the modulation of the amplitude and phase adjusted local oscillator beam on fiber 59b with the captured signal, the local oscillator beam carried on fiber 11 is modulated by a predetermined electric signal of given amplitude as supplied from the command and control module 42 in an identical manner as the modulation performed by the Mach-Zehnder interferometer 50. The phase shifter module 52b receives an electric signal from the command and control module 42 which causes a potential to be created across the lithium niobate path in module 52b, thus causing the index of refraction to change. As the index of refraction changes so to does the velocity at which light travelling through it. The larger the index of refraction, the slower the propagation rate, and the smaller the index of refraction, the faster the progation rate. Therefore, by changing the potential across the lithium niobate in module 52b, the phase of the local oscillator entering on fiber 11 can be changed. The output of the amplitude and phase control module 52 is fed into a beam splitter 56 resulting in two identical beams carried by fibers 59a and 59b one of which is used by the Mach-Zehnder interferometer 50 and the other is used by an optical coupler 58 to be discussed subsequently.

The local oscillator beam carried on fiber 11 is supplied by a laser (not shown) to an optical star coupler 22. The optical star coupler 22 is an array of fiber optic elements used to split and direct one oncoming light beam into a plurality of light beams. In this invention the preferred light beam is a highly coherent narrow beam of light such as obtained from a laser or laser diode. The optical star coupler 22 receives the incoming laser beam and provides each opto-electric transmitter/receiver with a local oscillator beam. The local oscillator beam emerging from the optical star coupler is routed to the amplitude and phase control module 52 via a fiber optic line such as fiber 11 illustrated in FIG. 2.

TRANSMIT MODE OF OPERATION

In the transmit mode of operation, a signal from the transmitter/receiver processing unit 34, shown in FIG. 1, is sent along with a plurality of control signals as a composite signal to the wavelength division multiplexer 54 via optical fiber 63. The composite signal entering the wavelength division multiplexer 54 is decomposed or decoded into the transmission signal and the individual control signals. Basically, the wavelength division multiplexer 54 is a series of optical filters used to separate out the transmission signal from the control signals as well as separating the individual control signals. The control signals are routed to command and control module 42 via optical fibers 65, 67, 69.

The signal to be transmitted exits the wavelength division multiplexer 54 on optical fiber 71 and is directed to an optical coupler 58. The optical coupler 58 also receives the amplitude and phase adjusted local oscillator beam on fiber 59a from beam splitter 56. The optical coupler 58 optically sums the amplitude and phase adjusted local oscillator beam 59a with the transmission signal. The summation of these two signals are necessary for the conversion of the optical transmission signal into an electromagnetic radio frequency signal in the electrical domain. The new composite signal beam, which is a mix signal, is then directed to a photodetector 62 via an optical fiber 73. The optical coupler 58 and the photodetector 62 in combination are commonly referred to as a single ended mixing circuit. This type of mixing circuit is functionally the same type of mixing circuit as the mixing circuit standard superheterodyne receivers. The mixing circuit of the superheterodyne receiver combines a modulated RF signal with the local oscillator signal to produce a modulated intermediate frequency signal. Due to the non-linear characteristics of the photodetector 62, the photodetector 62 acts as a square law device squaring the sum of the light amplitude resulting in sum and difference signals. The output of the photodetector 62 contains dc terms proportional to each light intensity, the amplified and phase adjusted local oscillator and transmission signal, and a RF term which corresponds to the difference in frequency of the amplified and phase adjusted local oscillator and transmission signals. A more complete treatise on square law devices is given in the *McGraw-Hill Encyclopedia of Electronics and Computers*, McGraw-Hill Book Company, Copyright 1984 McGraw Hill Inc., Pages 34-35.

The output of the photodetector 62 is then directed to a preamplifier 64 which amplifies the RF term of the output of the photodetector 62. The amplified RF signal is then directed to a second pre-amplifier 66 via signal line 75 where the gain of the signal is adjusted to suitable amplitude for radiating into space. The output of pre-amplifier 66 is then routed to the transmit/receive switching device 40, via signal line 77 and if the switching device 40 is set for transmission, the twice amplified transmission signal is allowed to pass through to radiating element 24 via signal line 21.

It is important to recall that the amplitude and phase of the local oscillator beam carried on fiber 11 has been adjusted in order to establish a specific orientation of the radiating signal in space. Each element of the phased array antenna radiates a signal to a specific set of coordinates in space by adjusting the amplitude and phase of the local oscillator beam. The combined effect of all elements is to develop a composite beam which is highly directional. Therefore, the transmitter/receiver processing unit 34 sends amplitude and phase commands to each specific opto-electric transmitter/receiver which results in the aforementioned composite beam.

Figure 3:
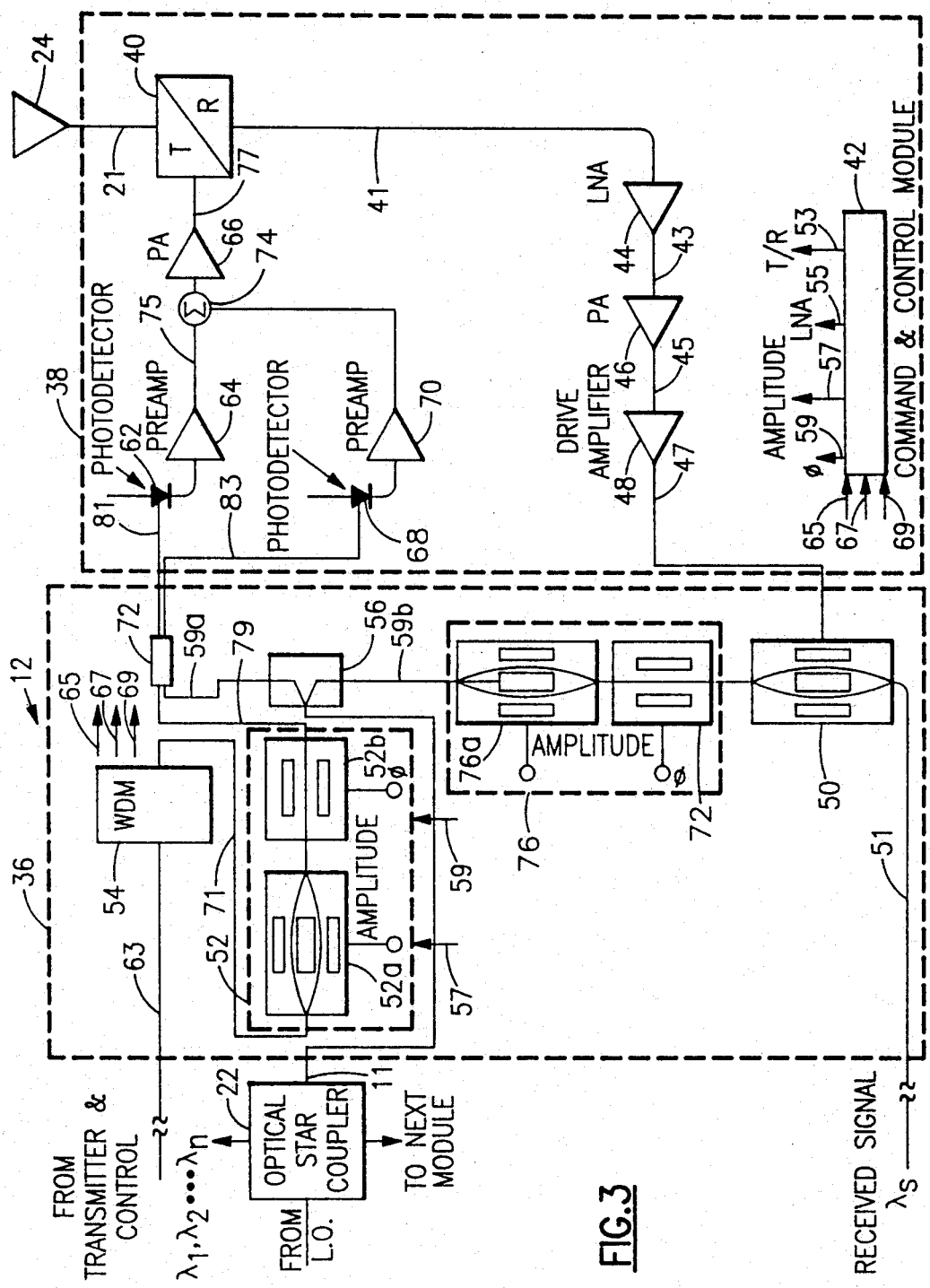
FIG. 3 is a block diagram of the opto-electric, transmitter/receiver module with a balanced mixer configuration and amplitude and phase control in the signal paths.

Referring now to FIG. 3, there is shown the opto-electric transmitter/receiver module 12 using a balanced mixing circuit configuration for conversion of the transmission signal into the electromagnetic domain. In this alternative embodiment, the signal to be transmitted that is carried on optical fiber 71 is supplied from the wavelength division multiplexer 54 and routed to the amplitude and phase control module 52 instead of the optical coupler 58 shown in FIG. 2. The amplitude and phase control of the local module 52 operates in an identical manner, but rather than adjusting the amplitude and phase of the local oscillator beam carried by fiber 11, the amplitude and phase of the signal to be transmitted is adjusted. The local oscillator beam carried by fiber 11 is routed into the beam splitter 56 directly where it is split into two identical beams carried by fibers 59a and 59b. The amplitude and phase adjusted transmission signal present on fiber 79 and local oscillator beam present on fiber 59a are routed to an integrated optical directional coupler and phase shifter 72. The integrated optical direction coupler and phase shifter 72 is an optical coupler similar to the optical coupler 58 described in FIG. 2; however, this coupler splits the local oscillator beam on fiber 59a into two beams that are exactly 180 degrees out of phase for reasons that will subsequently be explained. The amplitude and phase adjusted transmission signal carried on fiber 79 is also split into two beams, but are in phase. The two sets of amplitude and phase adjusted signals are optically summed with the two local oscillator beams resulting in two composite signals, which are mix signals, which are carried on optical fibers 81 and 83 which are 180 degrees out of phase. Each of the signals on optical fibers 81 and 83 is routed to a photodetector, 62 and 68 respectively, which perform identical functions as previously described. The outputs of these two photodetectors are amplified by preamplifiers 64 and 70 and are electronically summed by summing device 74. The output of the summing device 74 is amplified by preamplifier 66 and routed to the switching module 40.

The purpose of using this balanced mixer type configuration is to reduce oscillator noise. By having the transmission signal amplitude and phase adjusted, beam steering is still accomplished and by having the local oscillator beam split into two beams 180 degrees out of phase, which results in nulling amplitude variations in the oscillator beam when the beams are summed in the summing device 74. This alternative approach requires the addition of the integrated lithium niobate optical directional coupler and phase shifter 72, a second photodetector 68 and a second preamplifier 70 which both use gallium arsenide, an electronic summing device 74 which uses gallium arsenide and a second amplitude and phase control module 76 for adjusting the amplitude and phase of the local oscillator beam used in the receive mode.

Figure 4:
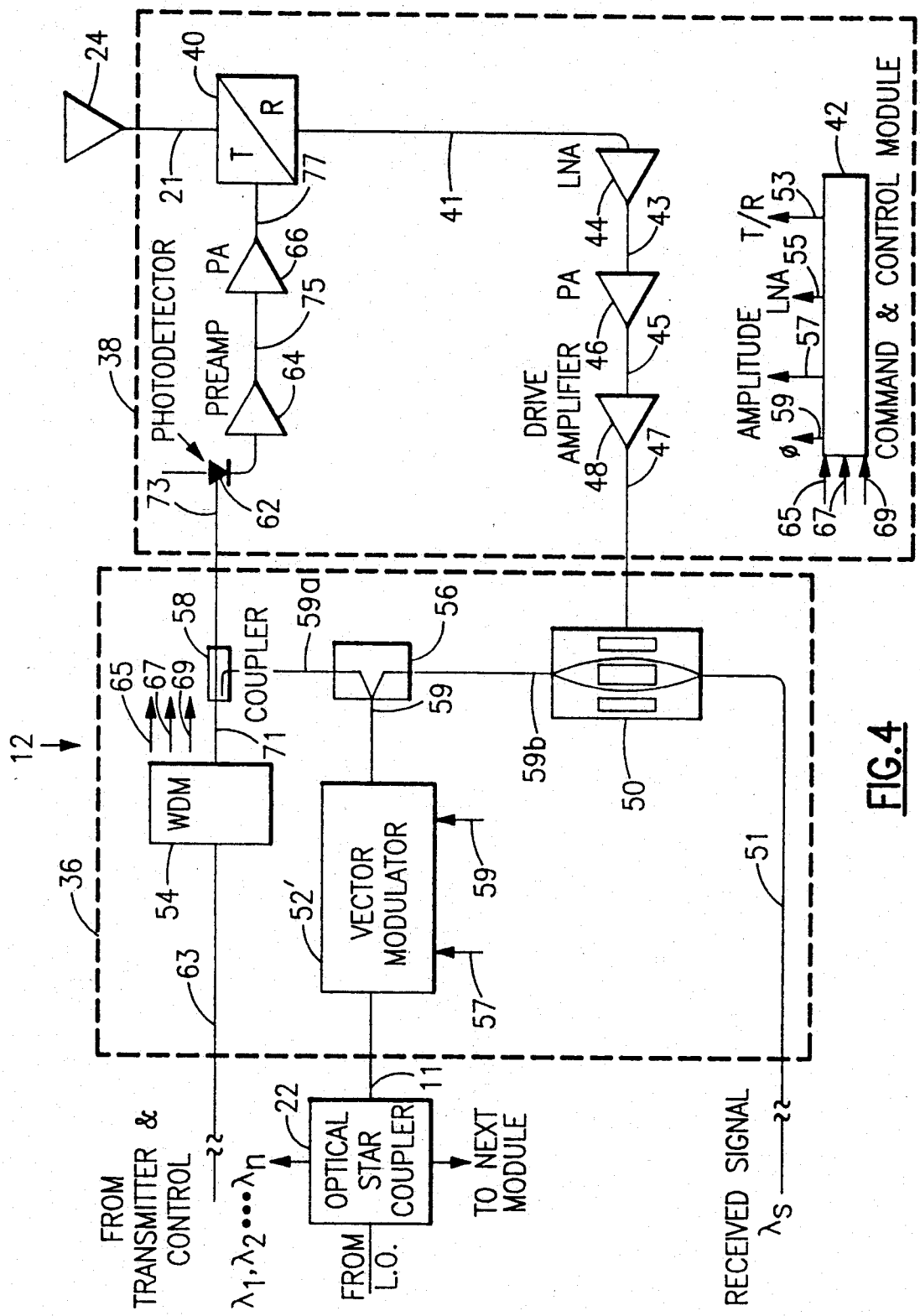
FIG. 4 is a block diagram of the opto-electric, transmitter/receiver module employing a vector modulator.
Figure 5:
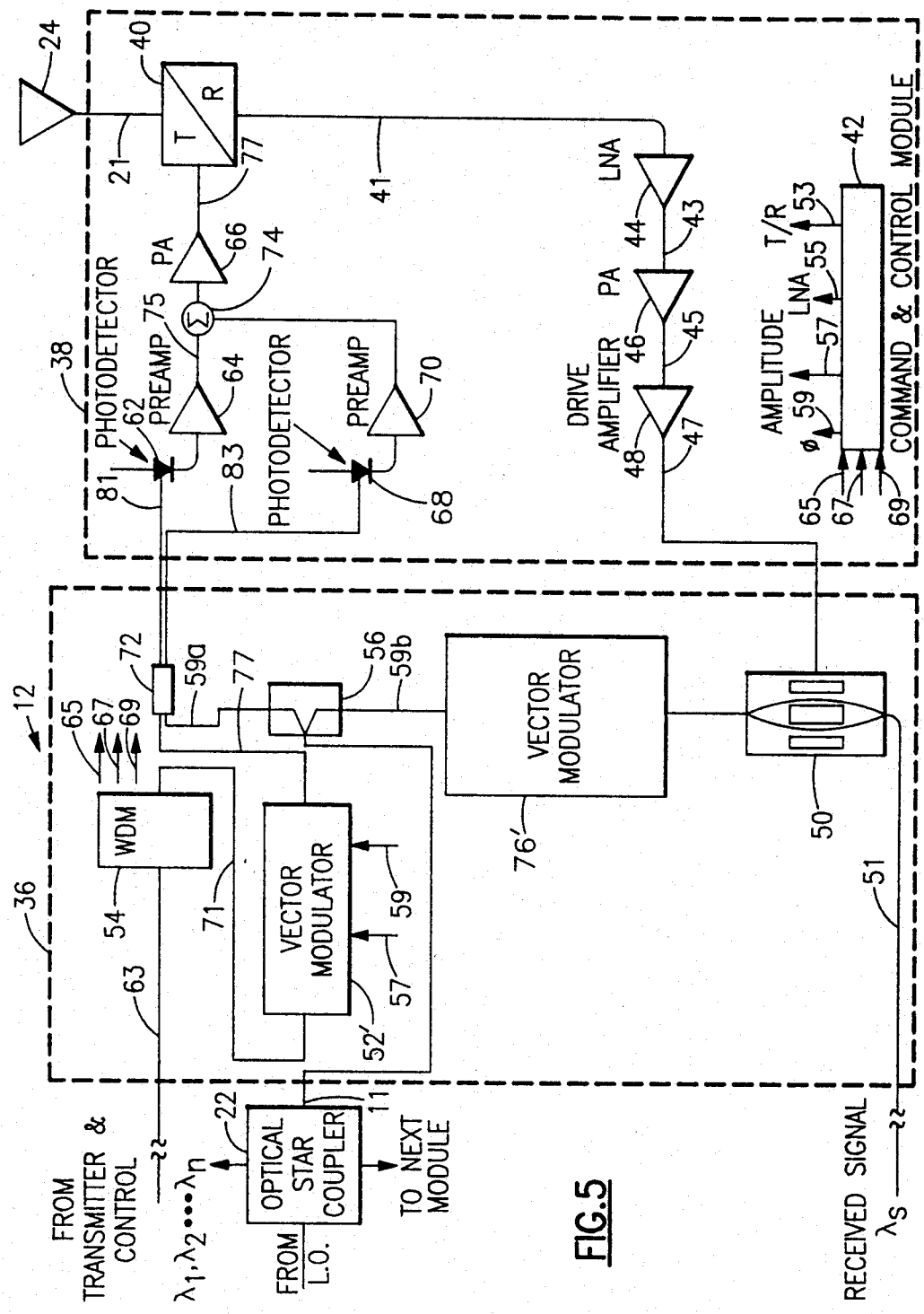
FIG. 5 is a block diagram of the opto-electric, transmitter/receiver module with a balanced mixer configuration utilizing vector modulators.

The amplitude and phase control module 52 shown in FIG. 2 and the amplitude and phase control modules 52 and 76 shown in FIG. 3 can be replaced by a vector modulator for adaptive nulling. The vector modulator also controls the amplitude and phase of signals that pass through it, however, it can also be used for the suppression and adaptive nulling of jamming signals or noise. By sensing the position or spatial angle of the jamming signal between fiber optic transmitter/receiver modules, the signal can be nulled. An example of an electrical vector modulator is the commercially available Olektron Complex Phasor Modulator (Olektron CPM Series) which is a small and versatile signal processing device that functions either as a pure phase control or amplitude control as well as a complex modulator. This modulator can be implemented utilizing all integrated optical components. The paper "Complex Phasor Modulators for Simultaneous Amplitude and Phase Control", by Dr. John Curtis provides a complete description of the device and its operation. The paper appears in the *Application Notes* provided by Olektron Components, Inc. located at 61 Sutton Road, Webster, Mass. 01570. FIGS. 4 and 5 show the amplitude and phase control modules 52 and 76 shown in FIGS. 2 and 3 replaced with vector modulators 52' and 76'.

Figure 6:
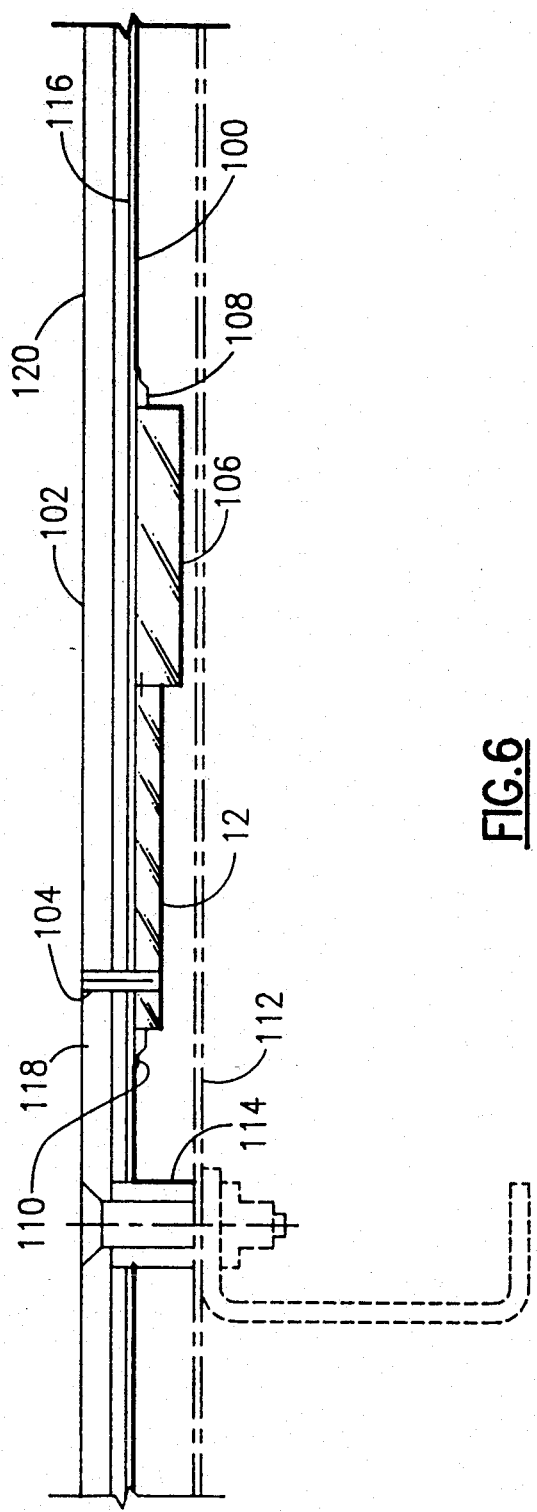
FIG. 6 is a cross sectional view of the opto-electric, GaAs transmitter/receiver imbedded in the surface of an airplane.

Referring now to FIG. 6, there is shown the opto-electric transmitter/receiver module 12 imbedded in the surface of a vehicle; namely, the outer skin of an airplane. The module 12 which is 0.125 inches thick is mounted on a planar flexible mounting means 100 which is secured to the outer skin of the aircraft. The mounting means 100 is a PC flex board which is 0.030 inches thick. The transmitter/receiver module 12 is connected to an antenna element 102 through an electric connection or electrical conductor 104. The antenna element is made of perforated copper, the layout of which is a function of frequency, which is 0.004 inches thick. The transmitter/receiver is also connected to a fiber optic interface 106 which is also secured to the PC flex board 100. Leads 108 and 110 connect the fiber optic interface 106 and the transmitter/receiver module 12 to the PC flex board 100 respectively. The module 12 and the fiber optic interface, which is 0.200 inches thick, resides in the gap created between the PC flex board 100 and the inner skin 112 which is created by a spacer cylinder 114. The inner skin 112 is 0.030 inches thick and the spacer cylinder 114 is 0.318 inches in diameter. Directly above the PC flex board is an insulation barrier 116 which is 0.060 inches thick. Above the insulation barrier 116 is the outer skin composite structure 118 which is 0.125 inches thick. The antenna element 102 is mounted on the composite skin structure 118 and covered by a radome coating 120 which is 0.004 inches. The radome coating 120 is a protective surface coating means that is transparent to radio frequency signals.

The above description specifically indicates how well suited the optic-electric transmitter/receiver module can be imbedded in the skin of an aircraft because of its integrated design. By placing the transmitter/receiver module in the skin of the aircraft, there is minimal, if any wind resistance; therefore, making the aircraft more aerodynamically efficient.

Although shown and described in what are believed to be the most practical and preferred embodiments, it is apparent that departures from specific methods and designs described and shown will suggest themselves to those skilled in the art and may be used without departing from the spirit and scope of the invention. The present invention is not restricted to the particular constructions described and illustrated, but should be construed to cover of all modifications that may fall within the scope of the appended claims.

What is claimed is:

1. An opto-electrical transmitter/receiver module for use with a transmitter/receiver element in a phase array antenna, said transmit/receiver element being adapted to transmit and to receive electromagnetic signals, said module comprising:

generating means for generating an optical input signal;
   optical receiving means for receiving an optical oscillator beam, splitting said beam into first and second component beams and directing said first and second component beams onto first and second paths respectively;
   heterodyning means located on said first path for receiving the optical input signal and the first component beam, and heterodyning said optical input signal with said first component beam to generate an optical transmit signal;
   converting means to receive the optical transmit signal from the heterodyning means and to convert said optical transmit signal to an electrical transmit signal;
   modulating means located on said second path for receiving the second component beam from the optical receiving means;
   switching means having (i) a first sate for transmitting the electrical transmit signal to the transmit/receiver element for transmission, and
   (ii) a second state for transmitting to the modulating means an electrical signal representing an electromagnetic signal received by the transmit/receiver element, said modulating means modulating said second component beam with said received electrical signal to generate an optical received signal; and
   control means for controlling the amplitude and phase of the optical transmit signal and the optical received signal, the control means including means for controlling the amplitude and phase of said optical oscillator beam before splitting said optical oscillator beam, whereby the first and second component beams directed to said heterodyning means and said modulating means are amplitude and phase controlled optical oscillator beams.

2. A transmitter/receiver module according to claim 1, wherein:
   said generating means also generates a plurality of optical control signals and transmits said optical control signals to the control means; and
   the control means further includes
   i) means for light amplitude modulation with an amplitude signal from said control means in response to said optical control signals, and
   ii) means for phase modulation by a phase signal from said control means in response to said optical control signals.

3. A transmitter/receiver module according to claim 1, wherein:
   said heterodyning means includes an optical coupler which optically sums said first component beam with said optical input signal; and
   said converting means includes a photodetector means which is a non-linear device functioning as a square law detector.

4. A transmitter/receiver module according to claim 3, wherein said converting means further includes means for amplifying the electrical transmit signal to a predetermined level.

5. A transmitter/receiver module according to claim 4, wherein said amplifying means comprises first and second preamplifier means for raising the gain of said electrical transmit signal.

6. A transmitter/receiver module according to claim 5, wherein:
   said converting means is an integrated electrical component implemented in gallium arsenide; and
   said optical coupler is an integrated optical component implemented in lithium niobate or glass.

7. An opto-electrical transmitter/receiver module for use with a transmit/receiver element in a phased array antenna, said transmit/receiver element being adapted to transmit and to receive electromagnetic signals, said module comprising:
   generating means for generating an optical input signal;
   optical receiving means for receiving an optical oscillator beam, splitting said beam into first and second component beams and directing said first and second component beams onto first and second paths respectively;
   heterodyning means located on said first path for receiving the optical input signal and the first component beam, and heterodyning said optical input signal with said first component beam to generate an optical transmit signal;

converting means to receive the optical transmit signal from the heterodyning means and to convert said optical transmit signal to an electrical transmit signal;

modulating means located on said second path for receiving the second component beam from the optical receiving means;

switching means having
(i) a first state for transmitting the electrical transmit signal to the transmit/receiver element for transmission, and
(ii) a second state for transmitting to the modulating means an electrical signal representing an electromagnetic signal received by the transmit/receiver element, said modulating means modulating said second component beam with said received electrical signal to generate an optical received signal; and control means for controlling the amplitude and phase of the optical transmit signal and the optical received signal, the control means including
i) means for controlling the amplitude and phase of said optical input signal between said generating means and said heterodyning means, and
ii) means for controlling the amplitude and phase of said second component beam between said optical receiving means and said modulating means.

8. A transmitter/receiver module according to claim 7, wherein:
said heterodyning means includes
i) means for splitting said first component oscillator beam into a first pair of beams which are 180 degrees out of phase with each other,
ii) means for splitting said optical input signal into a second pair of beams which are in phase with each other, and
iii) beams for optically summing said first and second pairs of beams to form first and second optical mix signals; and
said converting means includes:
i) first and second photodetector means for converting said first and second optical mix signals into first and second electrical pre-transmit signals, the first and second photodetectors being non-linear devices and functioning as square-law detectors, and
ii) means for electrically summing said first and second electrical pre-transmit signals to form said electrical transmit signal.

9. A transmitter/receiver module according to claim 8, wherein said means for splitting said first component oscillator beam, said means for splitting said optical input signal, and said means for optically summing comprises an optical coupler and phase shifter.

10. A transmitter/receiver module according to claim 9, wherein said converting means further includes first and second amplifying means for amplifying said first and second electrical pre-transmit signals to predetermined levels.

11. A transmitter/receiver module according to claim 10, wherein:
said first and second amplifying means comprise first and second preamplifier means for raising the gain of said first and second electrical pre-transmit signals between each of said first and second photodetector means and said electrically summing means; and the converting means further includes a third preamplifier means for raising the gain of said electrical transmit signal for transmission between said electrically summing means and said switching means.

12. A transmitter/receiver module according to claim 11, wherein:
said converting means is an integrated electrical component implemented in gallium arsenide; and
said optical coupler and phase shifter is an integrated optical component implemented in lithium niobate or glass.

13. A transmitter/receiver module according to claim 2, wherein said modulating means comprises means to modulate the amplitude and phase of second component beam with said received electrical signal.

14. A transmitter/receiver module according to claim 13, wherein said means to modulate the amplitude and phase of the second component beam comprises an interferometer light amplitude modulator.

15. A transmitter/receiver module according to claim 14, further comprising amplifying means for amplifying said received electrical signal to a predetermined level between said modulating means and said switching means.

16. A transmitter/receiver module according to claim 15, wherein said amplifying means includes:
a low noise amplifier or raising the gain of said received electrical signal to a first predetermined level;
a preamplifier for raising the gain of said received electrical signal from said first predetermined level to a second predetermined level; and
a drive amplifier for raising the gain of said received electrical signal output from said second predetermined level to a level for transmission to the modulating means.

17. A transmitter/receiver module according to claim 16, wherein said low noise amplifier comprises means for controlling said low noise amplifier by a low noise amplifier signal from said control means in response to said optical control signals.

18. A transmitter/receiver module according to claim 17, wherein:
said amplifying means is an integrated electrical component implemented in gallium arsenide; and
said interferometer is an integrated optical component implemented in lithium niobate or glass.

19. A transmitter/receiver module according to claim 2, wherein said optical receiving means comprises a beam splitter.

20. A transmitter/receiver module according to claim 19, wherein said beam splitter is an integrated optical component implemented in lithium niobate.

21. A transmitter/receiver module according to claim 2, wherein each of said means for light amplitude modulation and said means for phase modulation is a vector modulator implemented as an integrated lithium niobate component.

22. A transmitter/receiver module according to claim 2, wherein:
said generating means includes a wavelength division multiplexer; and
said control means includes a command and control module for receiving said optical control signals from aid generating means, for generating a plurality of electrical control signals and for transmitting the electrical control signals to said means for light amplitude modulation and said means for phase manipulation.

23. A transmitter/receiver module according to claim 22, wherein said command and control module includes a microprocessor based control system and associated memory for decoding said optical control signals.

24. A transmitter/receiver module according to claim 23, wherein said microprocessor based control system and associated memory is an integrated electrical component implemented in gallium arsenide.

25. A transmitter/receiver module according to claim 2, wherein said switching means comprises means for controlling said switching means by a transmit/receive signal from said control means in response to said optical control signals.

26. A transmitter/receiver module according to claim 25, wherein said switching means is an integrated electrical component implemented in gallium arsenide.

27. A method of controlling an electrical transmit signal and a received electrical signal in order to direct a radiation signal from a transmit/receiver element in a phase array antenna to a predetermined and controllable set of coordinates in space and to scan for an incoming electromagnetic signal, said method comprising the steps of:
  generating an optical input signal;
  receiving an optical oscillator beam, and splitting said beam into first and second component beams;
  heterodyning said optical input signal with said first component beam to generate an optical transmit signal;
  converting said optical transmit signal to an electrical transmit signal;
  switching between a first state for transmitting the electrical transmit signal to the transmit/receiver element for transmission and a second state for receiving a received electrical signal from the transmit/receiver element;
  modulating said second component beam with said received electrical signal to generate an optical received signal; and
  controlling the amplitude and phase of the optical transmit signal and the optical received signal, the controlling step including the step of controlling the amplitude and phase of said optical oscillator beam before splitting said optical oscillator beam, whereby the first and second component beams are amplitude and phase controlled optical oscillator beams.

28. A method according to claim 27, wherein:
said generating step includes the step of generating a plurality of optical control signals; and
said controlling step further includes the steps of
  i) light amplitude modulating in response to said optical control signals, and
  ii) phase manipulating by a phase signal in response to said optical control signals.

29. A method according to claim 27, wherein said heterodyning step comprises the step of optically summing said first component beam with said optical input signal.

30. A method according to claim 29, wherein said converting step includes the step of amplifying said electrical transmit signal to a predetermined level for radiating said electrical transmit signal to raise the gain thereof.

31. A method according to claim 29, wherein said converting step includes the step of preamplifying said electrical transmit signal to raise the gain thereof.

32. A method of controlling an electrical transmit signal and a received electrical signal in order to direct a radiation signal from a transmit/receiver element in a phased array antenna to a predetermined and controllable set of coordinates in space and to scan for an incoming electromagnetic signal, said method comprising the steps of:
  generating an optical input signal;
  receiving an optical oscillator beam, and splitting said beam into first and second component beams;
  heterodyning said optical input signal with said first component beam to generate an optical transmit signal;
  converting said optical transmit signal to an electrical transmit signal;
  switching between a first state for transmitting the electrical transmit signal to the transmit/receiver element for transmission and a second state for receiving a received electrical signal from the transmit/receiver element;
  modulating said second component beam with said received electrical signal to generate an optical received signal; and
  controlling the amplitude and phase of the optical transmit signal and the optical received signal, the controlling step including the steps of
    i) controlling the amplitude and phase of said optical input signal between said generating step and said heterodyning step, and
    ii) controlling the amplitude and phase of said second component beam between said directing step and said modulating step.

33. A method according to claim 32, wherein:
said heterodyning step includes the steps of
  i) splitting said first component beam into a first pair of beams which are 180 degrees out of phase with each other,
  ii) splitting said optical input signal into a second pair of beams which are in phase with each other, and
  iii) optically summing said first and second pairs of beams to form first and second optical mix signals; and
said converting step includes the steps of:
  i) converting said first and second optical mix signals into first and second electrical pre-transmit signals, and
  ii) electrically summing said first and second electrical pre-transmit signals to form said electrical transmit signal.

34. A method according to claim 33, wherein the steps of splitting said first component oscillator beam, splitting said optical input signal, and optically summing step said first and second electrical pre-transmit signals are performed by an optical coupler and phase shifter.

35. A method according to claim 34, wherein said converting step further includes the step of amplifying said first and second electrical pre-transmit signals to predetermined levels.

36. A method according to claim 35, wherein:
said step of amplifying said first and second electrical pre-transmit signals includes the steps of preamplifying the first and second electrical pre-transmit signals prior to said electrically summing step; and the converting step includes the step of further preamplifying said electrical transmit signal for transmission between said electrically summing step and said switching step.

37. A method according to claim 28, wherein said modulating step includes the step of modulating the amplitude of the second component beam with said received electrical signal.

38. A method according to claim 37, wherein said modulating step further includes the step of amplifying said received electrical signal to a predetermined level between said modulating step and said switching step.

39. A method according to claim 38, wherein said amplifying step comprises steps of:
low-noise amplifying said received electrical signal raise the gain thereof to a first predetermined level;
preamplifying said received electrical signal output after said low-noise amplifying step to raise the gain of said received electrical signal to a second predetermined level; and
drive-amplifying said received electrical signal after said preamplifying step to raise the gain of the received electrical signal to a level for use in the modulating step.

40. A method according to claim 39, wherein said low-noise-amplifying step includes the step of controlling said low noise amplifying step by a low noise amplifier signal in response to said optical control signals.

41. A method according to claim 28, wherein said modulating step includes the step of vector-modulating.

42. A method according to claim 28, wherein:
said generating step includes the step of wavelength-division-multiplexing said input optical transmit signal; and
said controlling step includes the step of generating a plurality of electrical control signals from said received optical control signals.

43. A method according to claim 42, wherein the step of generating said electrical control signals includes the step of decoding said optical control signal.

44. A method according to claim 28, wherein the switching step includes the step of controlling the switching means by a transmit/receive signal and in response to said optical control signals.

* * * * *

UNITED STATES PATENT AND TRADEMARK OFFICE
CERTIFICATE OF CORRECTION

PATENT NO. : 5,247,309
DATED : September 21, 1993
INVENTOR(S) : Stanley M. Reich It is certified that error appears in the above-indentified patent and that said Letters Patent is hereby corrected as shown below:

```
Column 1, line 12:  after "antenna" insert --.--
Column 6, line 33:  "on" should read --an--
Column 8, line 25:  "in" should read --is--
Column 16, line 66, Claim 22:  "aid" should
```
read --said--
```
Column 17, lines 66-67, Claim 30:  delete "to
```
raise the gain thereof" and insert --into space--

Signed and Sealed this

Fifth Day of July, 1994

Attest:

BRUCE LEHMAN

Attesting Officer     Commissioner of Patents and Trademarks